United States Patent [19]

Mochida et al.

[11] Patent Number: 4,487,042

[45] Date of Patent: Dec. 11, 1984

[54] STEERING LOCK ASSEMBLY

[75] Inventors: Haruo Mochida; Yoshimitsu Takeda, both of Yokohama; Takeshi Fukasawa, Tokyo; Mikio Masaki, Tokyo; Kiichi Shimizu, Tokyo; Satoru Kobayashi, Tokyo, all of Japan

[73] Assignees: Nissan Motor Company, Limited, Yokohama; Kokusan Kinzoku Kogyo Kabushiki Kaisha, Tokyo, both of Japan

[21] Appl. No.: 352,091

[22] Filed: Feb. 25, 1982

[30] Foreign Application Priority Data

Feb. 27, 1981 [JP] Japan .............................. 56-028054
Apr. 7, 1981 [JP] Japan .............................. 56-052171

[51] Int. Cl.³ ............................................. B60R 25/04
[52] U.S. Cl. ........................................ 70/186; 70/252
[58] Field of Search ................. 70/252, 185, 186, 261; 180/287

[56] References Cited

U.S. PATENT DOCUMENTS

| 3,633,394 | 1/1972 | Pieck | 70/389 |
| 3,680,335 | 8/1972 | Omishi | 70/252 |
| 3,702,550 | 11/1972 | Shimizo | 70/252 |
| 3,828,594 | 8/1974 | Yamomoto | 70/252 |
| 4,332,306 | 6/1982 | Turatti | 180/287 |

Primary Examiner—Robert L. Wolfe

[57] ABSTRACT

A steering lock assembly to lock and unlock a steering shaft by use of a key. The rotation of the rotor through key manipulation is controlled by a knob provided back of the steering lock assembly with a spacing to make impossible one-hand operation. Only when the knob is depressed, control means permits the rotor to rotate from an unlock position to a lock position with the result that car accidents due to inadvertent pulling out of the key on a down-hill ride is avoided.

18 Claims, 9 Drawing Figures

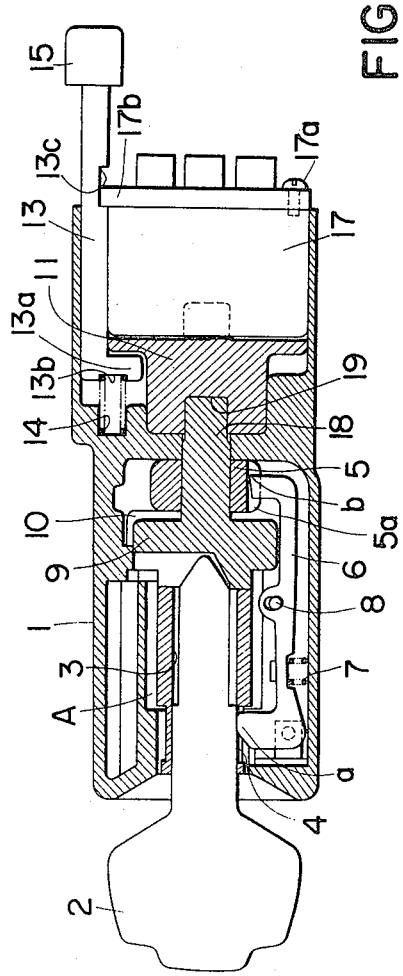
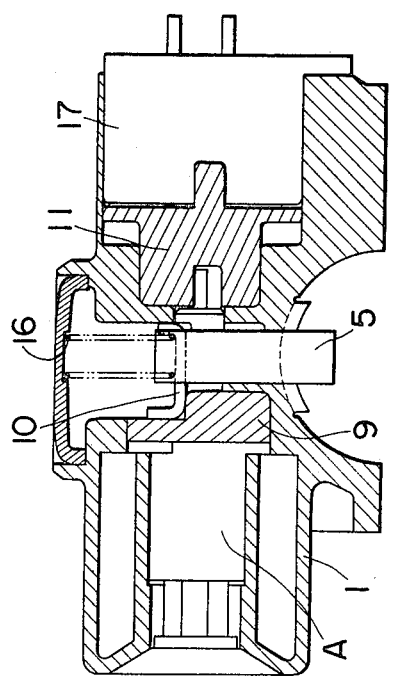

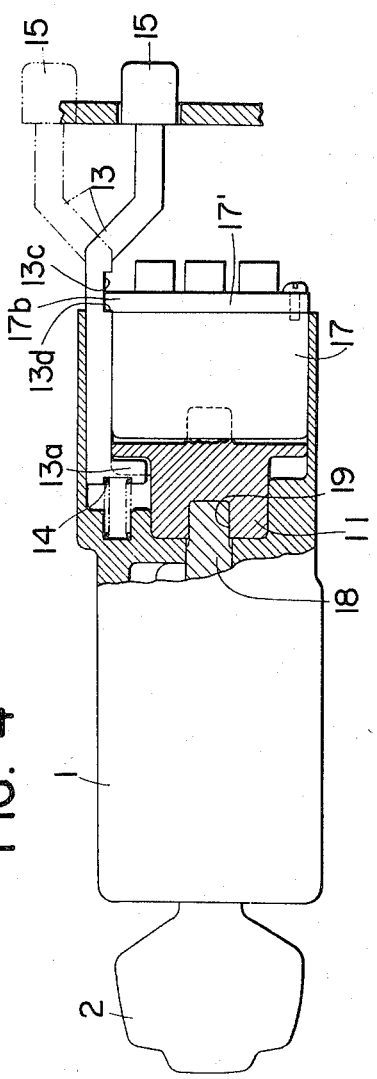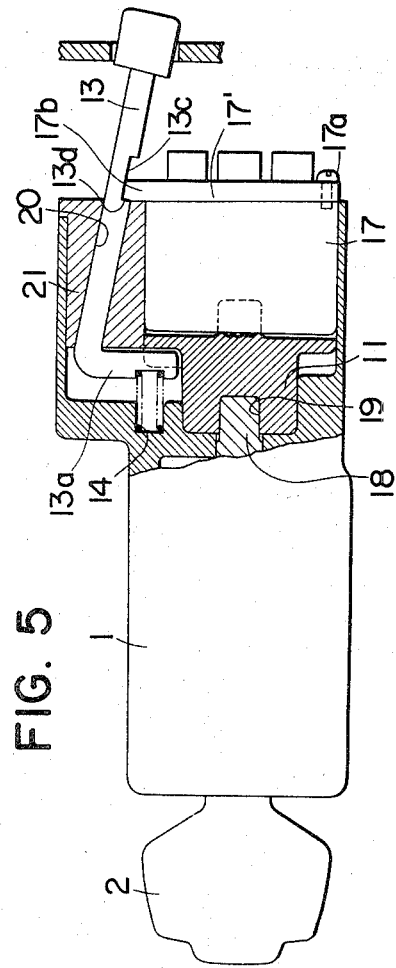
FIG. 4
FIG. 5

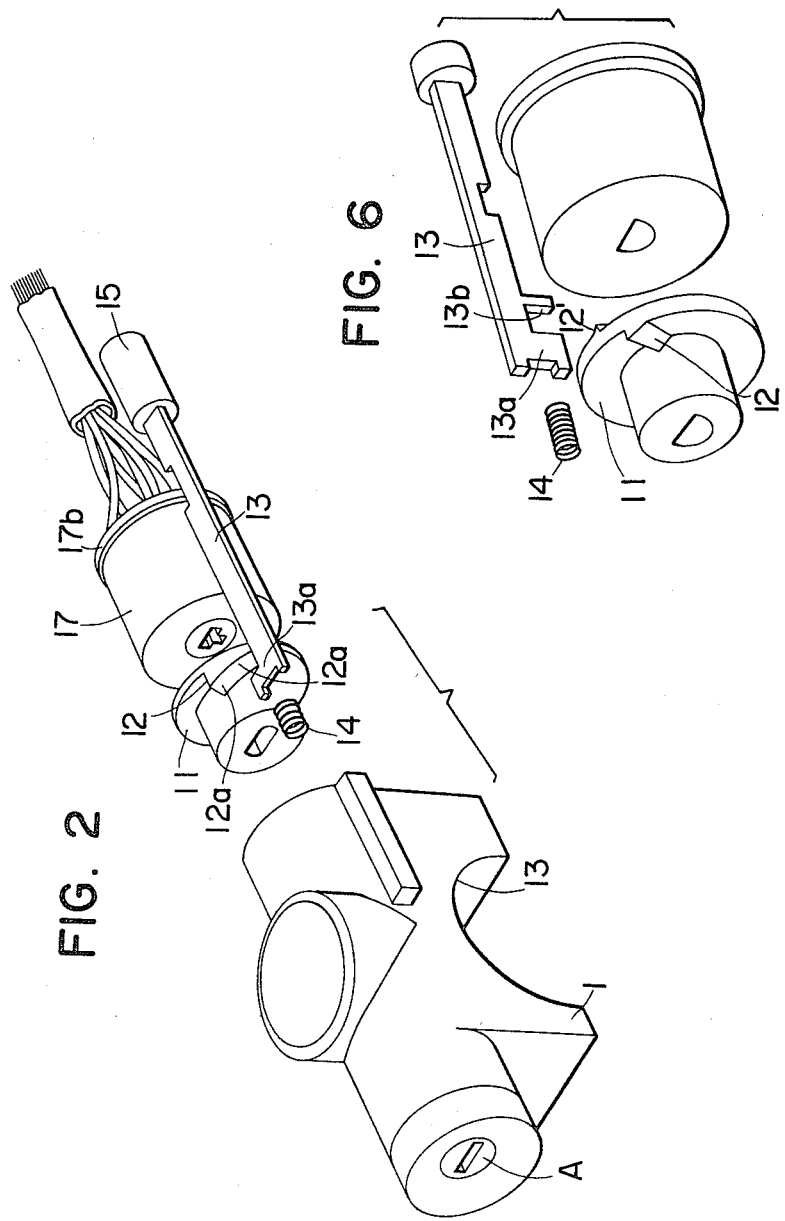

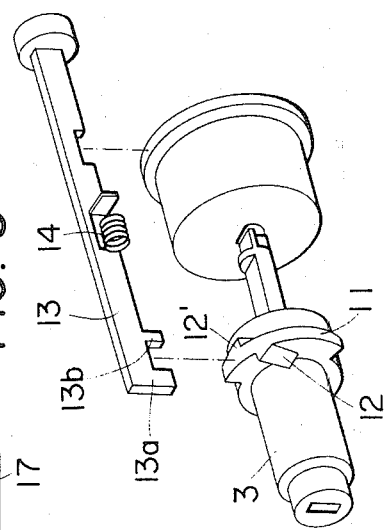
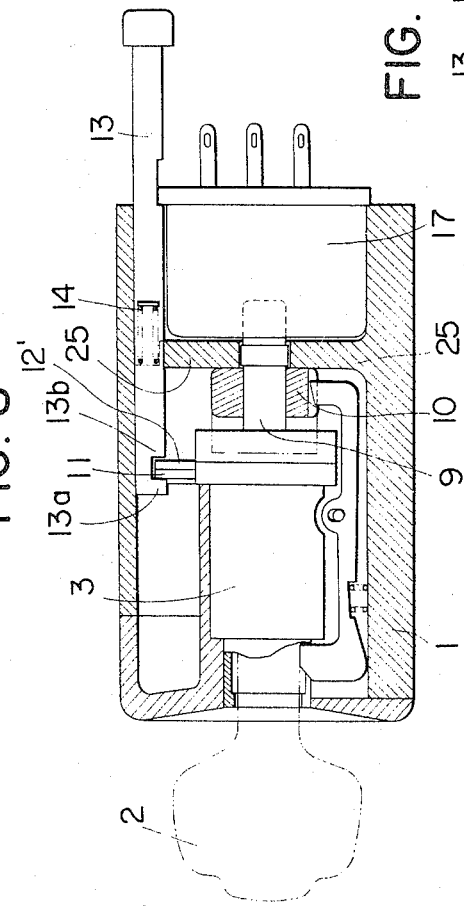
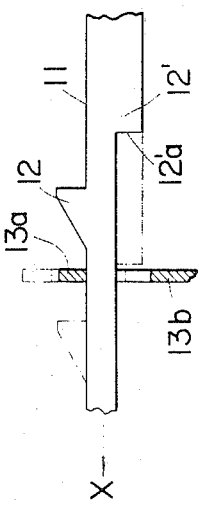

STEERING LOCK ASSEMBLY

BACKGROUND OF THE INVENTION

The present invention relates to a steering lock assembly which is designed to prevent a return of a key from an unlock position thereof to a lock position unless a special knob is manually operated.

Steering lock assemblies of the type described have been proposed for safe driving of automotive vehicles and actually put to practical use on some modern automotive vehicles.

In one of such prior art steering locks, a rotor integral with a key cylinder is partly notched to have a cam section which is selectively engaged by a member adapted to obstruct the rotation of the rotor. The stop member is manually pushed up or down to permit a key to be rotated to a locking position.

This type of steering lock is furnished with a safety device (e.g. a pivotal lever) so that a simple turn of the key to the lock position cannot cause the steering shaft to be locked in position. That is, the locking bolt cannot advance into locking enagement with a recess of the steering shaft unless the key is drawn out from the steering lock.

During a downhill drive of an automotive vehicle, for example, such a structure maintains the steering shaft still rotatable even when the key is turned to the lock position and thereby eliminates an accident.

It is not unusual for an operator to habitually pull out a key from the steering lock once the operator turns it to the lock position. Due to this habit, the operator may draw out the key even when the vehicle is in travel, as during a downhill drive.

Such a situation is potentially dangerous since the steering shaft would be locked in position.

With this in view, there has recently been proposed a steering lock assembly which permits the key to be turned to the lock position only when the turn of the key to said position is preceded by an operator's additional and intentional action, i.e. manipulation of the stop member.

However, all the prior art steering lock assemblies discussed above cannot fully achieve the object due to some unavoidable drawbacks.

For instance, the structure is disproportionately intricate. Meanwhile, the knob on the stop member or manual actuator is located near the key insertion position to allow easy access of the one hand which is operating the key. This may cause the key and stop member to be subjected to unintentional one-hand operation which would lead to an accident as previously mentioned.

SUMMARY OF THE INVENTION

It is accordingly an object of the present invention to promote safe operation of a motor vehicle by locating the knob at least out of the range accessible to the one hand manipulating the key.

It is another object of the present invention to provide a steering lock assembly which still performs its intended operation even if an adhesive tape or the like is misused to continuously actuate the knob.

In order to achieve this object, a steering lock assembly embodying the present invention includes a rotatable member interposed between an ignition switch and a key cylinder, and a stop member or manual actuation member having a knob thereon and selectively engageable with the rotatable member to limit the rotation of the latter, the knob on the manual actuation member being positioned away from the rotatable member.

BRIEF DESCRIPTION OF THE DRAWINGS

Drawings illustrate a preferred embodiment of the present invention, in which:

FIG. 1 is a sectional side elevation of one embodiment of the present invention;

FIG. 2 is a partly exploded perspective view of the embodiment of FIG. 1;

FIG. 3 is a fragmentary cut away view of a locking bolt and a cam on a rotor in their interengaged positions;

FIGS. 4 and 5 are fragmentary sections of other examples of a knob;

FIG. 6 is a fragmentary exploded perspective view of a steering lock device;

FIG. 7 is a view of first and second stop members on a rotary disc developed in an angular direction to illustrate their actions;

FIG. 8 is a view showing another embodiment of the present invention; and

FIG. 9 is a partly exploded perspective view of the embodiment of FIG. 8.

DETAILED DESCRIPTION OF THE EMBODIMENTS

The present invention will now be described with reference to the accompanying drawings.

Referring to FIGS. 1-3, a steering lock assembly of the present invention includes a cylinder lock housing 1 which is partitioned into a steering lock section on the front side and an ignition switch section on the rear side thereof. A key cylinder A is mounted in said steering lock section.

The key cylinder A has a rotor 3 which is rotated by a key 2 when the key 2 inserted into the key cylinder is turned in either direction. The rotor 3 is formed with a slot 4 in a neck portion thereof. A double arm pivotal lever or latch 6 has the free end of its one arm bent to form an abutment a which protrudes into the rotor 3 via the slot 4. The pivotal lever 6 serves to maintain a locking bolt 5 in an unlock position as will be described. With this arrangement, the abutment a of the lever 6 is engagable with a side edge of the key 2 through the slot 4 of the rotor 3 when the key 2 is thrust into the rotor 3.

The pivotal lever or latch 6 has a second abutment b at the free end of the other arm thereof. The second abutment b is selectively engageable in a notch 5a which is formed in a side portion of the locking bolt 5. A spring 7 is preloaded between the housing 1 and the latch 6 to constantly bias the latch 6 about a pin 8 clockwise, as viewed in FIG. 1. When the key 2 is pulled out from the rotor 3, the lever 6 will be moved clockwise by the force of the spring 7 causing its second abutment b to move clear of the notch 5a of the locking bolt.

A semicylindrical drive cam 9 extends axially from the rear end of the rotor 3. When the key inserted into the rotor 3 is turned, the cam 9 rotates in unison to pull the locking bolt 5 to its unlock position while in abutting engagement with an angled projection 10 on a side face of the locking bolt 5. The cam 9 is formed with an axially rearwardly extending shaft 18 which is fit in a recess 19 of a generally discshaped rotatable member 11. Thus, the rotary disc 11 moves in unison with the cam 9 when the key 2 is turned as mentioned above.

When the locking bolt 5 is in the unlock position, the second abutment b of the latch 6 remains in engagement with the notch 5a of the locking bolt 5 so as to maintain the locking bolt 5 in the unlock position against the action of a spring 16. This spring 16 is disposed between the locking bolt 5 and the housing 1 to constantly bias the locking bolt 5 toward the locking position.

Therefore, when the key 2 is being turned to the locking position or left inserted in the rotor 3, the locking bolt 5 still remains in the unlocking position.

In such a situation, if the key 2 in the lock position were pulled out from the key cylinder A while the vehicle is in travel as during a downhill travel, the abutment b of the latch 6 would be brought out of engagement with the notch 5a of the locking bolt 5 to release the locking bolt 5 to the lock position under the action of the spring 16. To preclude such a danger, a manual actuation member 13 is located to the rear of the rotary disc 11. The manual actuation member 13 has at its end 13a a recess 13b in which one end of a spring 14 is received, the other end of which is seated on the housing 1, so that the member 13 is constantly biased by the spring 14 outwardly of the housing. When the key 2 is rotated from the unlock position toward the lock position, the end 13a of the manual actuator 13 has already been brought, automatically by the spring, into locking engagement with a first one-way stop or a radial shoulder 12 of the rotary disc 11. (FIG. 2). With this arrangement, the key 2 is prevented from unintentionally being turned to the locking position while the vehicle is running.

A knob 15 is carried on the other end of the manual actuator member 13 to be manipulatable for pushing the manual actuator member 13 axially into the housing 1 against the action of the spring 14. The rotary disc 11 is formed with a slope 12a which connects to the shoulder 12. Accordingly, the key 2 can be turned from the lock position to the unlock position without requiring any manipulation of the knob 15, since the end 13a of the manual actuator can ride over or slide on the slope 12a. The reference numeral 17 designates an ignition switch mounted in the rear end of the housing 1.

Alternatives to the straight manual actuator 13 as shown in FIG. 1 are illustrated in FIGS. 4 and 5. In FIG. 4, the manual actuator 13 is suitably bent outside the housing 1 of the steering lock. In FIG. 5, a guide member 21 having an inclined through bore 20 is fixedly mounted in the ignition switch section of housing 1 and an angled manual actuator 13 is passed through the inclined bore 20. Such alternative designs may be employed to make effective use of a relatively narrow space available for the manual actuator 13.

As seen in FIGS. 4 and 5, the ignition switch 17 is mounted in the ignition switch section of the housing and fastened thereto by screws 17a. Stated another way, the ignition switch 17 can be readily removed from the housing 1 merely by unfastening the screws 17a. This promotes the ease of replacement of a part, which will be required when the manual actuator 13 is broken by an excessive load at the momemt its end 13a obstructs the movement of the disc 11 to the locking position.

Furthermore, the ignition switch 17 has at its end a radially outwardly extending flange 17b which is engaged in a notch or recess 13b of the manual actuator member 13. The flange 17b is engaged by an end 13c of the recess 13b so that the inner end 13a of the manual actuator 13 is kept apart from the periphery of the rotary disc 11. Despite the fact that the manual actuator 13 is constantly biased by the spring 14, such a spacing between the manual actuator 13 and the disc 11 allows no frictional resistance which would otherwise impair smooth turning of the key 2.

The relationship between the rotary disc 11 and the manual actuator 13 in a further modification is best shown in FIGS. 6 and 7. The rotary disc 11 is formed with a first one-way stop 12 which is slidably engaged with a first lug 13a of the manual actuator 13 in an inoperative position of the manual actuator 13. The stop 12 is positioned such that, when the rotary disc 11 is angularly moved in the direction of arrow X in FIG. 7 from the lock position in solid to the unlock position in phantom, the lug 13a rides over the stop 12 and comes into engagement therewith. Accordingly, once the rotary disc 11 is moved to the unlock position beyond the manual actuator 13, it is prevented from moving back to the lock position due to engagement of the stop 12 with the lug 13a, unless the manual actuator 13 is operated.

The rotary disc 11 is also formed with a second one-way stop 12' on its surface opposite to that which has the first stop thereon. The second stop 12' has a shoulder 12'a adjacent to the manual actuator 13 to cooperate with a second lug 13b of the manual actuator 13 when the manual actuator is pushed into the housing 1 against the force of the spring 14. In the unlock position of the rotary disc 11 indicated in phantom in FIG. 7, the projection 12' is located just behind the second lug 13b with respect to the advancing direction X of the rotary disc 11. With this arrangement, when the manual actuator 13 is pushed into its operative position, the lug 13b is brought into engagement with the shoulder 12'a of the projection 12' thereby preventing the rotary disc 11 from advancing to any further functional position i.e. the unlock position. It should be noted, however, that the position of the second lug 13b of the manual actuator 13 shown and described is only illustrative; all that is required is to inhibit an angular movement of the rotor 3 to any functional position.

The steering lock having the above construction will be operated as follows. In the locking position of the rotor 3, all the component elements of the assembly are positioned as indicated by solid lines in the drawings. When the key 2 is thrust into the key slot of the rotor 3 and turned to rotate the rotor 3 to the unlock position, the locking bolt 5 is raised by the semicylindrical cam 9 through the angled projection 10 making the steering shaft free to rotate in the steering column. Simultaneously, the disc 11 is angularly moved in the direction X of FIG. 7. As the rotor 3 reaches the unlock position, the first stop 12 on the disc 11 is moved clear of the first lug 13a of the manual actuator 13 whereby the rotor 3 is permitted to rotate freely. However mere manipulation of the key 2 cannot bring the rotor 3 back to the lock position since the shoulder 12 of the disc 11 would abut against the first lug 13a of the manual actuator 13. (FIG. 6)

When it is desired to pull out the key from the steering lock, as in a parking lot, the disc 11 is rotated in the opposite direction to the direction X with the knob 15 on the manual actuator depressed. Then, the first lug 13a of the manual actuator 13 is moved out of the path of the first stop 12 as indicated by the phantom line in FIG. 7, so that the rotor 3 can be returned to the lock position.

When the manual actuator 13 is intentionally retained in its inward or lock position, as by fixing the knob 15 with an adhesive tape, the rotor 3 is prevented from moving to a unlock position. In the operative position shown in phantom in FIG. 7, the second lug 13b of the manual actuator 13 protrudes into the range of movement of the projection 12' of the disc 11. Under this condition, a movement of the key cylinder 3 from the locking position to the unlock position would be blocked by the engagement of the second lug 13b with the shoulder 12'a of the projection 12', if the knob is kept depressed after locking operation of the steering lock assembly. (FIG. 6).

FIGS. 8 and 9 are views similar to FIGS. 1 and 6 but showing a second embodiment of the present invention. The steering lock in FIG. 8 includes a modified rotary disc 11 which is formed integrally with the rotor 3 and cam 9 in contrast to the rotary disc 11 in the first embodiment. Alternatively, said rotary disc member 11 may be replaced by a flange integrally formed around the rotor 3. Such a structure is advantageous in that the integral body of the rotor 3 and disc 11 or the flange facilitates its arrangement inside the housing 1 and cuts down the production cost. Another advantage is that, due to the position of the disc 11 concealed in a steering lock section by the partition 25, there can be prevented an offending act to manipulate the cam structure after removing the ignition switch and manual actuator 13.

While the locking members have been shown and described as comprising cams or pins, it will be understood that they may be replaced by any other suitable locking means such as locking members at least a part of which is formed on a peripheral surface.

In summary, it will be seen that the present invention provides a steering lock assembly which is practical and ensures safe operation of a motor vehicle. The operator always has to push axially the knob 15 on the manual actuator 13 against the bias of the spring 14 when intending to turn the key 2 to the locking position. This, coupled with the inherent position of the knob 15 out of the reach of the key manipulating hand, prevents the operator from touching the knob 15 with his or her hand or clothes. The double hand action required for turning the key to the locking position makes it impossible for the operator to pull out the key while the vehicle is running as during a downhill drive, since it would oblige the operator to release the steering wheel. Also, the steering lock prevents its manual actuator from being made unfunctionable as by fixing with an adhesive tape.

What is claimed is:

1. A steering lock assembly to lock and unlock a steering shaft by use of a key, comprising:
   a cylinder lock housing having an ignition switch section on a rear side thereof;
   rotor means accommodated within said housing and having a first one-way stop permitting the rotor means to rotate from a lock position to an unlock position but preventing the rotor means from rotating from the unlock position to the lock position;
   control means for, during rotation of said rotor means to the unlock position, riding over said first one-way stop and coming into engagement therewith, said control means being biased in a predetermined position to press contact the first one-way stop and including an actuator member having a portion extending back of said ignition switch section; and
   a knob coupled to said control means and positioned away from said rotor means, said knob being adapted to be manipulated axially.

2. A steering lock assembly according to claim 1, wherein said cylinder lock housing is partitioned into a steering lock section on a front side and said ignition switch section.

3. A steering lock assembly according to claim 2, wherein said rotor means includes a rotor positioned within the steering lock section and a rotary disc member coupled to said rotor and positioned within the ignition switch section.

4. A steering lock assembly according to claim 3, wherein said rotary disc member has a flange therearound, the first one-way stop being formed in said flange on a front side thereof.

5. A steering lock assembly according to claim 2, wherein said rotor means includes a rotor positioned within said steering lock section.

6. A steering lock assembly according to claim 5, wherein said rotor has a flange therearound, the first one-way stop being formed in said flange on a front side thereof.

7. A steering lock assembly according to claim 1, wherein said control means is held resiliently relative to the cylinder lock housing.

8. A steering lock assembly according to claim 1, wherein said actuator member portion is bent.

9. A steering lock assembly according to claim 1, wherein said actuator member has a portion extending within the ignition switch section.

10. A steering lock assembly according to claim 5, wherein said actuator member has a portion extending within the cylinder lock section.

11. A steering lock assembly according to claim 1, wherein said ignition switch section accommodates an ignition switch therein.

12. A steering lock assembly according to claim 11, wherein said ignition switch has a flange therearound laterally extending to cover the ignition switch in the ignition switch section, the actuator member having a notch to receive said flange of the ignition switch to provide a limited range of movement to said actuator member.

13. A steering lock assembly according to claim 1, wherein said ignition switch section has a guide member to receive said actuator member slantwise.

14. A steering lock assembly according to claim 2, wherein said rotor means has a second one-way stop adapted to permit the rotor means to rotate from an unlock position to a lock position but prevent the same from rotating from the lock position to the unlock position, the control means being adapted to slide, during rotation of said rotor means, along said second one-way stop and come into engagement therewith if the knob is kept depressed after locking operation.

15. A steering lock assembly according to claim 14, wherein said rotor means includes a rotor positioned within the steering lock section and a rotary disc member coupled to said rotor and positioned within the ignition switch section.

16. A steering lock assembly according to claim 15, wherein said rotary disc member has a flange therearound, the second one-way stop being formed in said flange on a rear side thereof.

17. A steering lock assembly according to claim 14, wherein said rotor means includes a rotor positioned within said steering lock section.

18. A steering lock assembly according to claim 14, wherein said rotor has a flange therearound, the second one-way stop being formed in said flange on a rear side thereof.

* * * * *